United States Patent
Park (10) Patent No.: US 11,827,225 B2
(45) Date of Patent: Nov. 28, 2023

(54) LANE CHANGE ASSISTANCE SYSTEM AND LANE CHANGE METHOD USING THE SAME

(71) Applicant: HYUNDAI MOBIS CO., LTD., Seoul (KR)

(72) Inventor: Jin Young Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 252 days.

(21) Appl. No.: 17/361,670

(22) Filed: Jun. 29, 2021

(65) Prior Publication Data
US 2021/0402999 A1    Dec. 30, 2021

(30) Foreign Application Priority Data
Jun. 30, 2020  (KR) .................. 10-2020-0080472

(51) Int. Cl.
*B60W 30/04*    (2006.01)
*B60W 30/18*    (2012.01)
(Continued)

(52) U.S. Cl.
CPC ...... *B60W 30/18163* (2013.01); *B60W 10/04* (2013.01); *B60W 10/20* (2013.01);
(Continued)

(58) Field of Classification Search
CPC .......... B60W 30/18163; B60W 10/04; B60W 10/20; B60W 50/0098; B60W 2520/10;
(Continued)

(56) References Cited

U.S. PATENT DOCUMENTS 10,807,596 B2 * 10/2020 Oh ................... B60W 30/0956
2005/0256630 A1 * 11/2005 Nishira ................ B60W 40/04
701/41

(Continued)

FOREIGN PATENT DOCUMENTS

CN        1758046 A     4/2006
CN      104709283 A     6/2015
(Continued)

OTHER PUBLICATIONS

Office Action issued in corresponding Chinese Patent Application No. 202110720221.6 dated May 24, 2023, with English translation.

*Primary Examiner* — Jonathan M Dager
*Assistant Examiner* — Jean W Charleston
(74) *Attorney, Agent, or Firm* — MORGAN, LEWIS & BOCKIUS LLP (57) ABSTRACT

A lane change assistance system includes: at least one sensor that detects sensing information including a first vehicle speed of a host vehicle, a second vehicle speed of a surrounding vehicle around the host vehicle, and a distance between the host vehicle and the surrounding vehicle; a lane change controller that identifies a lane change possible condition based on the sensing information, calculates an expected lane change time, and generates a lane change path for the expected lane change time; a steering device that controls lateral movement of the host vehicle based on the lane change path; and an acceleration and deceleration device that controls longitudinal movement of the host vehicle based on the lane change path.

19 Claims, 6 Drawing Sheets

(51) Int. Cl.
  B60W 10/04 (2006.01)
  B60W 10/20 (2006.01)
  B60W 50/00 (2006.01)
(52) U.S. Cl.
  CPC ..... *B60W 50/0098* (2013.01); *B60W 2520/10* (2013.01); *B60W 2554/4041* (2020.02); *B60W 2554/4042* (2020.02); *B60W 2554/802* (2020.02); *B60W 2710/207* (2013.01); *B60W 2720/106* (2013.01)
(58) Field of Classification Search
  CPC . B60W 2554/4041; B60W 2554/4042; B60W 2554/802; B60W 2710/207; B60W 2720/106; B60W 2554/80; B60W 2554/801; B60W 60/001; B60W 30/08; B60W 40/02; B60W 40/105; B60W 2420/00; B60W 2554/804; B60W 2720/10; B60Y 2300/08; B60Y 2300/18166; B60Y 2400/30
  USPC .......................................................... 701/25
  See application file for complete search history.

(56) References Cited

U.S. PATENT DOCUMENTS

| | | |
|---|---|---|
| 2009/0088925 A1 | 4/2009 | Sugawara et al. |
| 2019/0172355 A1* | 6/2019 | Stock .................... B60W 30/14 |
| 2019/0187719 A1* | 6/2019 | El-Khatib .............. G08G 1/167 |
| 2019/0315348 A1* | 10/2019 | Mimura ............. G01C 21/3647 |
| 2019/0315361 A1* | 10/2019 | Park ...................... B60W 50/12 |
| 2020/0180635 A1* | 6/2020 | Hong ................. B62D 15/0255 |
| 2021/0046936 A1* | 2/2021 | Umeda ................. B60W 10/20 |

FOREIGN PATENT DOCUMENTS

| | | |
|---|---|---|
| CN | 104718125 A | 6/2015 |
| CN | 105752081 A | 7/2016 |
| CN | 107264531 A | 10/2017 |
| CN | 109857002 A | 6/2019 |
| CN | 111267842 A | 6/2020 |

* cited by examiner

LANE CHANGE ASSISTANCE SYSTEM AND LANE CHANGE METHOD USING THE SAME

CROSS-REFERENCE TO RELATED APPLICATION

This application claims the benefit of priority to Korean Patent Application No. 10-2020-0080472, filed in the Korean Intellectual Property Office on Jun. 30, 2020, the entire contents of which are incorporated herein by reference.

TECHNICAL FIELD

The present disclosure relates to a lane change assistance system and a lane change method using the same.

BACKGROUND

A lane change assistance system is a system which automatically makes a lane change using information such as an input or a path setting of a driver.

The lane change assistance system determines a probability of colliding with an object around a vehicle to safely make a lane change. The result of determining the collision that there is the probability of collision is used to limit the start of a lane change assistance function or return to an original lane.

Particularly, it is urgent to develop a technology capable of determining a probability of collision with regard to behaviors of target vehicles which are traveling on a target lane when a host vehicle makes a lane change and safely making a lane change.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a lane change assistance system for calculating a minimum/maximum time for completing a lane change while avoiding a collision with target vehicles which are traveling on a target lane when a host vehicle makes a lane change and generating a lane change path according to the calculated time and a lane change method using the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lane change assistance system may include at least one sensor that detects sensing information including a first vehicle speed of a host vehicle, a second vehicle speed of a surrounding vehicle around the host vehicle, and a distance between the host vehicle and the surrounding vehicle; a lane change controller that identifies a lane change possible condition based on the sensing information, calculates an expected lane change time, and generates a lane change path for the expected lane change time; a steering device that controls lateral movement of the host vehicle based on the lane change path; and an acceleration and deceleration device that controls longitudinal movement of the host vehicle based on the lane change path.

According to another aspect of the present disclosure, a lane change method may include: detecting sensing information including a vehicle speed of a host vehicle, a vehicle speed of a surrounding vehicle, and a distance between the host vehicle and the surrounding vehicle; determining whether a lane change possible condition is satisfied based on the sensing information; upon determining that the lane change possible condition is satisfied, calculating an expected lane change time based on the sensing information; and generating a lane change path based on the expected lane change time. The generating of the lane change path may include setting an initial value and a target value including the expected lane change time using a minimum jerk trajectory and generating the lane change path according to a dynamic equation of motion based on the set initial value and the set target value.

BRIEF DESCRIPTION OF THE DRAWINGS

The above and other objects, features and advantages of the present disclosure will be more apparent from the following detailed description taken in conjunction with the accompanying drawings.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Hereinafter, embodiments of the present disclosure will be described in detail with reference to FIGS. 1 to 3.

Figure 1:
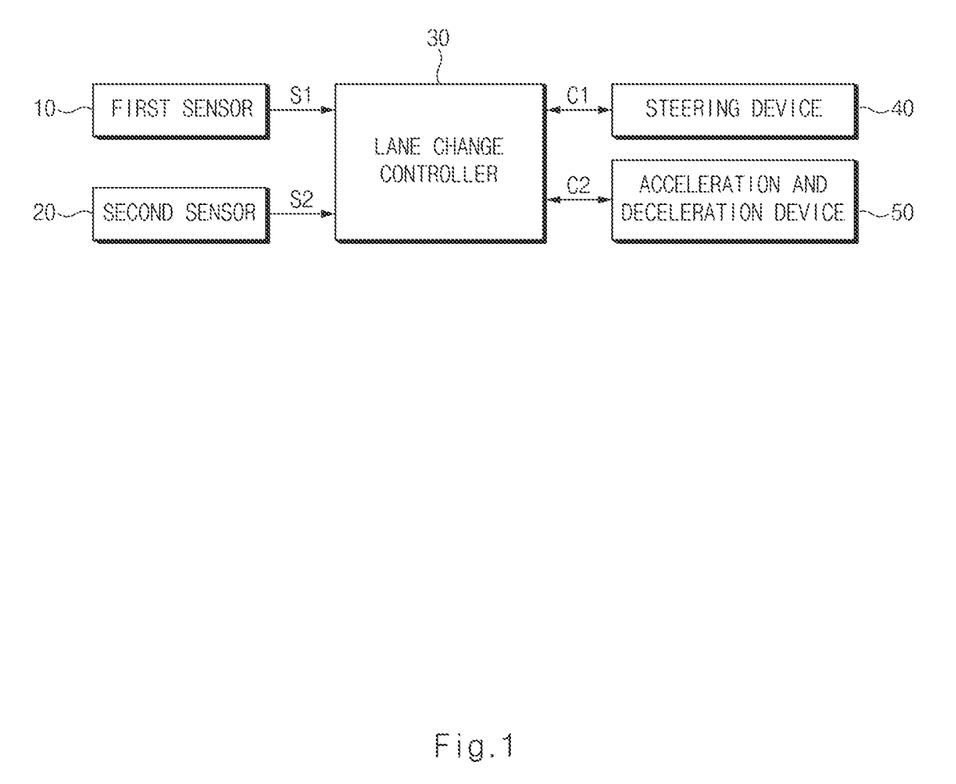
FIG. 1 is a block diagram illustrating a configuration of a lane change assistance system according to an embodiment of the present disclosure.

FIG. 1 is a block diagram illustrating a configuration of a lane change assistance system according to an embodiment of the present disclosure.

Referring to FIG. 1, the lane change assistance system according to an embodiment of the present disclosure may be implemented in a vehicle. In this case, a lane change controller 30 may be integrally configured with control units in the vehicle or may be implemented as a separate device to be connected with the control units of the vehicle by a separate connection means.

Referring to FIG. 1, the lane change assistance system according to an embodiment of the present disclosure may include a first sensor 10, a second sensor 20, a lane change controller 30, a steering device 40, and an acceleration and deceleration device 50.

The first sensor 10 may provide the lane change controller 30 with information obtained by sensing a vehicle speed of a host vehicle as first sensing information S1.

The second sensor 20 may provide the lane change controller 30 with information obtained by sensing an object around the host vehicle as second sensing information S2.

For example, the second sensor 20 may provide the lane change controller 30 with information obtained by sensing a surrounding vehicle around the host vehicle as the second sensing information S2.

In this case, the second sensing information S2 provided to the lane change controller 30 by the second sensor 20 may include information about a distance between the host vehicle and the surrounding vehicle and information about a speed of the surrounding vehicle.

In detail, the second sensor 20 used in the lane change assistance system according to an embodiment of the present disclosure may include information about a distance between a vehicle which is traveling on a target lane and the host vehicle, when the host vehicle changes a traveling lane to the target lane, and information about a speed of the vehicle which is traveling on the target lane.

When there is a preceding vehicle traveling in front of the host vehicle on the target lane, the second sensor 20 may provide the lane change controller 30 with a distance between the preceding vehicle and the host vehicle and a vehicle speed of the preceding vehicle as the second sensing information S2.

When there is a following vehicle traveling behind the host vehicle on the target lane, the second sensor 20 may provide the lane change controller 30 with a distance between the following vehicle and the host vehicle and a vehicle speed of the following vehicle as the second sensing information S2.

Furthermore, when there is a preceding vehicle traveling in front of the host vehicle on the target lane and there is a following vehicle traveling behind the host vehicle on the target lane, the second sensor 20 may provide the lane change controller 30 with a distance between the preceding vehicle and the host vehicle, a distance between the following vehicle and the host vehicle, a vehicle speed of the preceding vehicle, and a vehicle speed of the following vehicle as the second sensing information S2.

Hereinafter, a description will be given of an example where there are both of a preceding vehicle and a following vehicle on the target lane.

Hereinafter, it is assumed that the second sensing information S2 provided to the lane change controller 30 by the second sensor 20 includes a distance between the preceding vehicle and the host vehicle, a distance between the following vehicle and the host vehicle, a vehicle speed of the preceding vehicle, and a vehicle speed of the following vehicle.

Furthermore, hereinafter, when the host vehicle makes a lane change to the target lane, a preceding vehicle traveling on the target lane and a following vehicle traveling on the target lane are referred to as the preceding vehicle and the following vehicle for convenience of description.

The lane change controller 30 may generate steering control information C1 and acceleration and deceleration control information C2 based on the first sensing information S1 and the second sensing information S2.

In this case, the steering control information C1 may be provided to the steering device 40, and the acceleration and deceleration control information C2 may be provided to the acceleration and deceleration device 50.

For example, the lane change controller 30 may calculate an expected lane change time based on the first sensing information S1 and the second sensing information S2 and may generate the steering control information C1 and the acceleration and deceleration control information C2 based on the calculated expected lane change time.

In detail, the lane change controller 30 may calculate the expected lane change time based on a vehicle speed of the host vehicle, a vehicle speed of the preceding vehicle, a vehicle speed of the following vehicle, a distance between the host vehicle and the preceding vehicle, and a distance between the host vehicle and the following vehicle and may generate the steering control information C1 and the acceleration and deceleration control information C2 based on the calculated expected lane change time.

The steering device 40 may control a steering angle of the host vehicle based on the steering control information C1 to control lateral movement of the host vehicle.

The acceleration and deceleration device 50 may control a vehicle speed of the host vehicle based on the acceleration and deceleration control information C2 to control longitudinal movement of the host vehicle.

Figure 2:
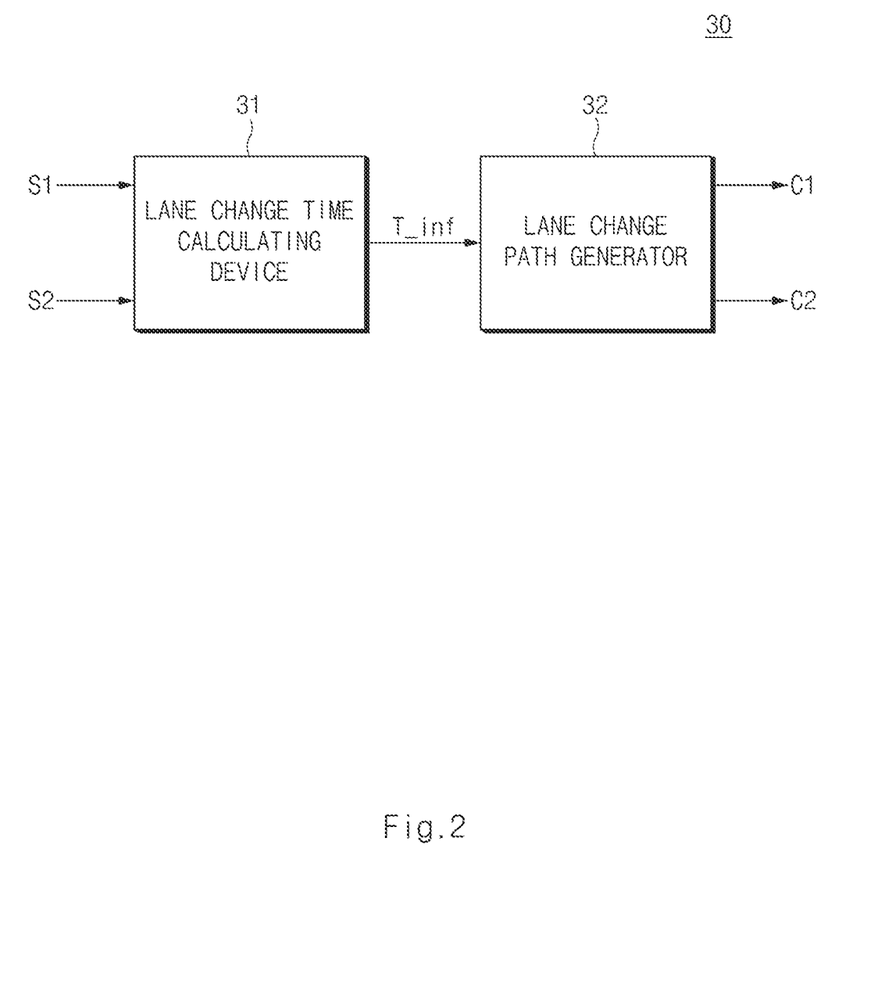
FIG. 2 is a block diagram illustrating a configuration of a lane change controller of a lane change assistance system according to an embodiment of the present disclosure.

FIG. 2 is a block diagram illustrating a configuration of a lane change controller of a lane change assistance system according to an embodiment of the present disclosure. FIGS. 3 to 6 are drawings illustrating a lane change assistance system according to an embodiment of the present disclosure.

Referring to FIG. 2, a lane change controller 30 may include a lane change time calculating device 31 and a lane change path generator 32.

The lane change time calculating device 31 may calculate an expected lane change time T_inf based on first sensing information S1 and second sensing information S2.

For example, the lane change time calculating device 31 may calculate the expected lane change time T_inf based on a vehicle speed of a host vehicle, a vehicle speed of a preceding vehicle, a vehicle speed of a following vehicle, a distance between the host vehicle and the preceding vehicle, and a distance between the host vehicle and the following vehicle.

In this case, the expected lane change time T_inf may include an expected lane change minimum time and an expected lane change maximum time. When the expected lane change time T_inf is greater than a predetermined range, the lane change time calculating device 31 may determine that it is impossible to make a lane change.

In detail, the lane change time calculating device 31 may calculate the expected lane change time T_inf based on a time to collision (TTC) and an inter-vehicular time (TIV).

When the vehicle speed of the following vehicle is greater than the vehicle speed of the preceding vehicle, the TTC may be defined as $$TTC = \frac{d}{V_{lag} - V_{lead}}$$

as a formula for calculating a time until the preceding vehicle and the following vehicle collides with each other at a relative speed.

In this case, $V_{lead}$ may denote the vehicle speed of the preceding vehicle, $V_{lag}$ may denote the vehicle speed of the following vehicle, and the distance between the preceding vehicle and the following vehicle may be denoted as d.

TIV may be defined as $$TIV = \frac{d}{V_{lag}}$$

as a formula for calculating a time taken to arrive at a current location of the preceding vehicle when the following vehicle travels at a current vehicle speed.

In this case, $V_{lag}$ may be the vehicle speed of the following vehicle, and d may be the distance between the preceding vehicle and the following vehicle.

When the host vehicle and a surrounding vehicle (e.g., a preceding vehicle or a following vehicle) are traveling at a high relative speed and when the TTC is greater than or equal to 2 seconds, the lane change controller 30 of the lane change assistance system according to an embodiment of the present disclosure may use the TTC as a criterion of determining that it is possible to make a lane change. Furthermore, when the host vehicle and the surrounding vehicle (e.g., the preceding vehicle or the following vehicle) are narrow in distance and when the TIV is greater than or equal to 1 second, the lane change controller 30 may use the TIV as a criterion of determining that it is possible to make a lane change.

As a result, the lane change assistance system according to an embodiment of the present disclosure may determine whether there is a condition where it is possible to make a lane change on the basis of the TTC, when the host vehicle and the surrounding vehicle perform high speed driving such as highway driving. When a gap between the host vehicle and the surrounding vehicle is narrow like urban driving, the lane change assistance system may determine whether there is a condition where it is possible to make a lane change on the basis of the TIV.

Furthermore, it is assumed that the lane change time calculating device 31 determines that it is possible to make a lane change, when the expected lane change time T_inf calculated by the lane change time calculating device 31 should be greater than or equal to a minimum of 4.5 seconds and should not be greater than a maximum of 7.5 seconds.

The lane change path generator 32 may generate steering control information C1 and acceleration and deceleration control information C2 based on the expected lane change time T_inf.

The lane change path generator 32 may generate the steering control information C1 for controlling lateral movement of the host vehicle and the acceleration and deceleration control information C2 for controlling longitudinal movement of the host vehicle, depending on the expected lane change time T_inf using a minimum jerk trajectory and a dynamic equation of motion.

A description will be given of the lane change time calculating device 31 with reference to FIG. 3.

First of all, a description will be given of a manner which calculates the expected lane change time T_inf using the concept of TTC.

Figure 3:
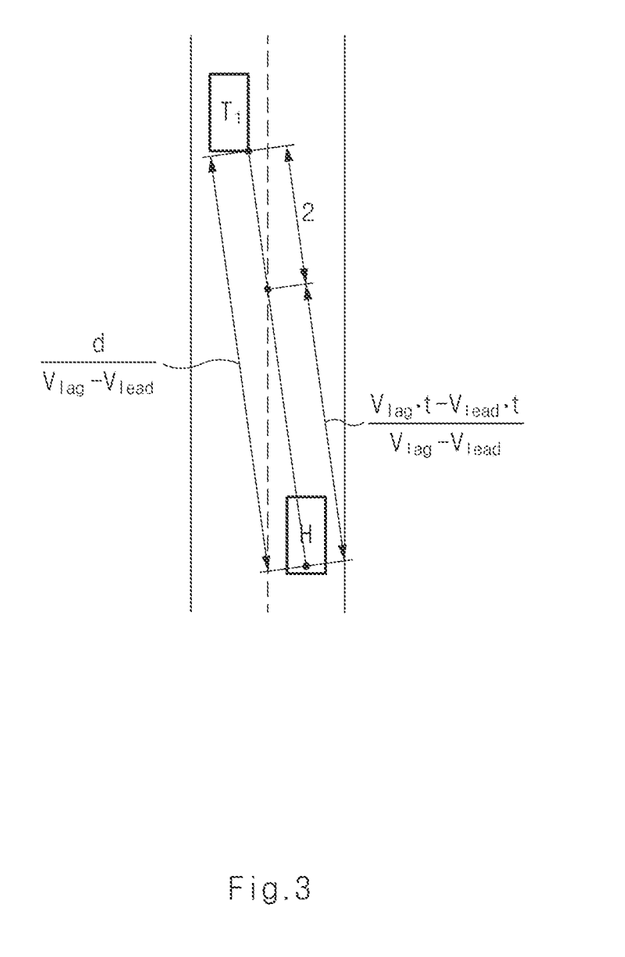
FIGS. 3, 4, 5, and 6 are drawings illustrating a lane change assistance system according to an embodiment of the present disclosure.

FIG. 3 illustrates that a following vehicle H attempts to make a lane change to a lane where a preceding vehicle $T_1$ travels in a state where the preceding vehicle $T_1$ and the following vehicle H are traveling.

A time before the preceding vehicle $T_1$ and the following vehicle H collide with each other at a relative speed between the preceding vehicle $T_1$ and the following vehicle H may be a value obtained by dividing a distance between the preceding vehicle $T_1$ and the following vehicle H by a speed difference between the preceding vehicle $T_1$ and the following vehicle H.

The time before the preceding vehicle $T_1$ and the following vehicle H collide with each other at the relative speed between the preceding vehicle $T_1$ and the following vehicle H may be represented as $$\frac{d}{V_{lag} - V_{lead}}.$$

In this case, the vehicle speed of the following vehicle H may be defined as $V_{lag}$, the vehicle speed of the preceding vehicle $T_1$ may be defined as $V_{lead}$, and the distance between the preceding vehicle $T_1$ and the following vehicle H may be defined as d.

As described above, because it is assumed that it is possible to make a lane change when the TTC should be greater than or equal to 2 seconds, a time t taken until the lane change of the following vehicle H is completed should be shorter over 2 seconds than a time before the preceding vehicle $T_1$ and the following vehicle H collide with each other at a relative speed.

Therefore, a formula such as $$\frac{d}{V_{lag} - V_{lead}} \geq 2 + \frac{V_{lag} \cdot t - V_{lead} \cdot t}{V_{lag} - V_{lead}}$$

may be established.

When the formula is solved on the basis of t, it may be represented as $$t \leq \frac{d - 2(V_{lag} - V_{lead})}{V_{lag} - V_{lead}}.$$

In this case, because the TTC is a numerical value indicating a time until the preceding vehicle and the following vehicle collide with each other based on the relative speed between the preceding vehicle and the following vehicle, a TTC condition may be always met because there is no risk of collision when the vehicle speed of the preceding vehicle is faster than the vehicle speed of the following vehicle.

Thus, the TTC condition may be valid, when the vehicle speed of the following vehicle is higher than the vehicle speed of the preceding vehicle.

Figure 4:
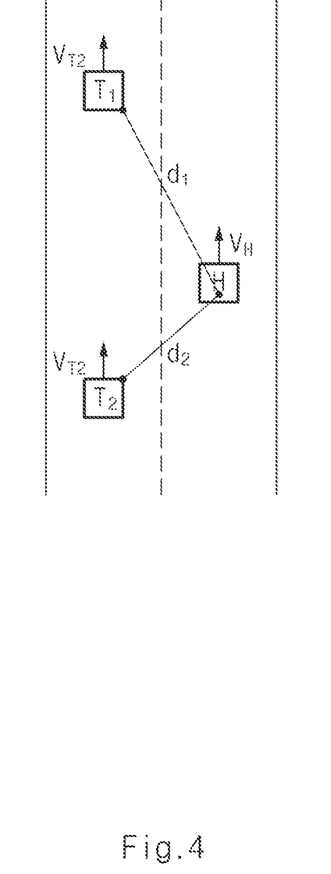

Referring to FIG. 4, a preceding vehicle $T_1$ and a following vehicle $T_2$ traveling on a target lane of a host vehicle H when the host vehicle H makes a lane change are shown.

Thus, a lane change time and a condition based on a TTC between the host vehicle H and the preceding vehicle $T_1$ may be represented as $$t_1^{max} = \frac{d_1 - 2(V_H - V_{T1})}{V_H - V_{T1}}, \text{ if } V_{T1} < V_H$$

based on the TTC. In this case, a formula obtaining a maximum value of the lane change time is disclosed to obtain the safest lane change time. $d_1$ is the distance between the host vehicle H and the preceding vehicle $T_1$, the vehicle speed of the preceding vehicle $T_1$ is $V_{T1}$, and the vehicle speed of the host vehicle H is $V_H$.

Furthermore, a lane change time and a condition based on a TTC between the host vehicle H and the following vehicle $T_2$ may be represented as $$t_2^{max} = \frac{d_2 - 2(V_{T2} - V_H)}{V_{T2} - V_H}, \text{ if } V_H < V_{T2}$$

based on the TTC. In this case, a formula obtaining a maximum value of the lane change time is disclosed to obtain the safest lane change time. $d_2$ is the distance between the host vehicle H and the following vehicle $T_2$, the vehicle speed of the host vehicle H is $V_H$, and the vehicle speed of the following vehicle $T_2$ is $V_{T2}$.

A description will be given of the lane change time calculating device 31 using the concept of TIV with reference to FIG. 5.

Figure 5:
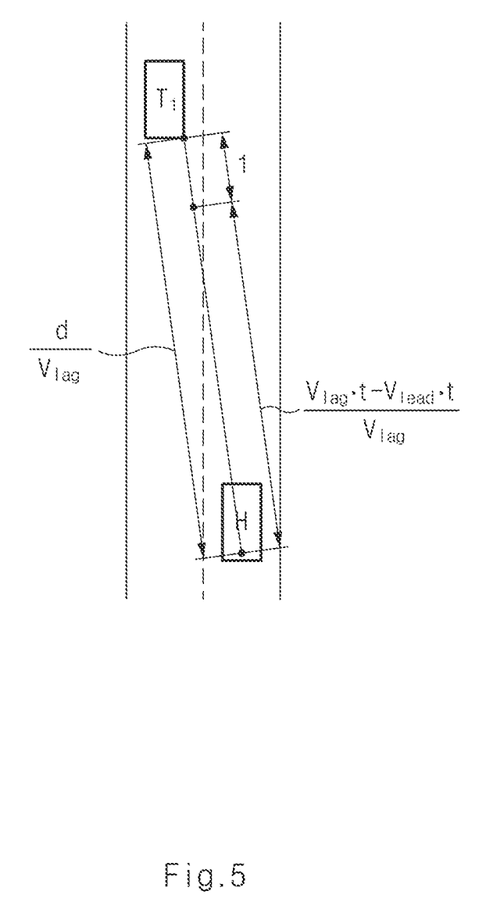

FIG. 5 illustrates that a following vehicle H attempts to make a lane change to a lane where a preceding vehicle $T_1$ travels in a state where the preceding vehicle $T_1$ and the following vehicle H are traveling.

A time until the following vehicle H arrives at a current location of the preceding vehicle $T_1$ may be a value obtained by dividing a distance between the preceding vehicle $T_1$ and the following vehicle H by a vehicle speed of the following vehicle H.

Thus, the time until the following vehicle H arrives at the current location of the preceding vehicle $T_1$ may be represented as $$\frac{d}{V_{lag}}.$$

In this case, the vehicle speed of the following vehicle H may be defined as $V_{lag}$ and the distance between the preceding vehicle $T_1$ and the following vehicle H may be defined as d.

As described above, because it is assumed that it is possible to make a lane change when the TIV should be greater than or equal to 1 second, a time t taken until the lane change of the following vehicle H is completed should be shorter over 1 second than a time until the following vehicle H arrives at the current location of the preceding vehicle $T_1$.

Therefore, a formula such as $$\frac{d}{V_{lag}} \geq 1 + \frac{V_{lag} \cdot t - V_{lead} \cdot t}{V_{lag}}$$

may be established. In this case, $V_{lag} \cdot t$ denotes the distance where the following vehicle H moves during t seconds and $V_{lead} \cdot t$ denotes the distance where the preceding vehicle $T_1$ moves during t seconds.

When the formula is solved on the basis of t, it may be represented as $$t \geq \frac{V_{lag} - d}{V_{lead} - V_{lag}}.$$

In this case, when the vehicle speed $V_{lead}$ of the preceding vehicle $T_1$ is higher than the vehicle speed Vlag of the following vehicle H, a time t taken until the lane change is completed may be represented as a minimum time.

When the vehicle speed Vlead of the preceding vehicle T1 is lower than the vehicle speed Vlag of the following vehicle H, it may be represented as $$t \leq \frac{V_{lag} - d}{V_{lead} - V_{lag}}$$

and the time t taken until the lane change is completed may be represented as a maximum time.

Referring to FIG. 4, the preceding vehicle $T_1$ and the following vehicle $T_2$ traveling on the target lane of the host vehicle H when the host vehicle H makes a lane change are shown in FIG. 4.

Thus, a lane change time based on a TIV between the host vehicle H and the preceding vehicle $T_1$ may be represented as a minimum time, when the vehicle speed of the preceding vehicle $T_1$ is higher than the vehicle speed of the host vehicle H, and may be represented as a maximum time, when the vehicle speed of the preceding vehicle $T_1$ is lower than the vehicle speed of the host vehicle H.

To sum up, a lane change time and a condition based on the TIV between the host vehicle H and the preceding vehicle $T_1$ may be represented as $$t_1^{min} = \frac{V_H - d_1}{V_{T1} - V_H}, \text{ if } V_{T1} > V_H \text{ and } t_3^{max} = \frac{V_H - d_1}{V_{T1} - V_H}, \text{ if } V_{T1} < V_H.$$

Furthermore, a lane change time based on a TIV between the host vehicle H and the following vehicle $T_2$ may be represented as a minimum time, when the vehicle speed of the host vehicle H is higher than the vehicle speed of the following vehicle $T_2$, and may be represented as a maximum time, when the vehicle speed of the host vehicle H is lower than the vehicle speed of the following vehicle $T_2$.

To sum up, a lane change time and a condition based on a TIV between the host vehicle H and the following vehicle $T_2$ may be represented as $$t_2^{min} = \frac{V_{T2} - d_2}{V_H - V_{T2}}, \text{ if } V_H > V_{T2} \text{ and } t_4^{max} = \frac{V_{T2} - d_2}{V_H - V_{T2}}, \text{ if } V_H < V_{T2}.$$

As such, when the host vehicle H makes a lane change, the lane change time calculating device 31 may calculate a time taken until the lane change based on each of the TTC and the TIV is completed in a state where the preceding vehicle $T_1$ and the following vehicle $T_2$ are traveling on a target lane.

The lane change time calculating device 31 may calculate $t_1^{max}$ and $t_2^{max}$ based on the TTC and may calculate $t_1^{min}$, $t_2^{min}$, $t_3^{max}$, and $t_4^{max}$ based on the TIV, depending on a vehicle speed of each of the preceding vehicle $T_1$, the host vehicle H, and the following vehicle $T_2$, a distance $d_1$ between the preceding vehicle $T_1$ and the host vehicle H, and a distance $d_2$ between the host vehicle H and the following vehicle $T_2$.

In this case, because it is assumed that the expected lane change time should be greater than or equal to a minimum of 4.5 seconds in the lane change assistance system according to an embodiment of the present disclosure, the lane change time calculating device 31 may output the largest value among the times ($t_1^{min}$ and $t_2^{min}$) calculated as the minimum time among the calculated times and 4.5 seconds as a minimum time of the expected lane change time T_inf.

Furthermore, because it is assumed that the expected lane change time should be less than 7.5 seconds in the lane change assistance system according to an embodiment of the present disclosure, the lane change time calculating device 31 may output the smallest value among the times ($t_1^{max}$, $t_2^{max}$, $t_3^{max}$, and $t_4^{max}$) calculated as the maximum time and 7.5 seconds as a maximum time of the expected lane change time T_inf.

As a result, the lane change time calculating device 31 may calculate the minimum time and the maximum time of the expected lane change time T_inf based on a vehicle speed of each of the preceding vehicle $T_1$, the host vehicle H, and the following vehicle $T_2$, a distance $d_1$ between the preceding vehicle $T_1$ and the host vehicle H, and a distance $d_2$ between the host vehicle H and the following vehicle $T_2$ and may provide the lane change path generator 32 with the minimum time and the maximum time.

The operation of the lane change path generator 32 of FIG. 2 will be described in detail.

The lane change path generator 32 may generate a lane change path according to the expected lane change time T_inf provided from the lane change time calculating device 31.

In this case, to generate the lane change path according to the expected lane change time T_inf, the lane change path generator 32 may set an initial value and a target value of the host vehicle H using a minimum jerk trajectory and may substitute the initial value and the target value into a dynamic equation of motion, thus generating lateral coordinates and longitudinal coordinates of the host vehicle H.

The generated lateral coordinates of the host vehicle H may be provided as steering control information C1 to a steering device 40 of FIG. 1 and the longitudinal coordinates of the host vehicle H may be as acceleration and deceleration control information C2 provided to an acceleration and deceleration device 50 of FIG. 1.

First of all, the operation of generating the longitudinal coordinates of the lane change path generator 32 will be described below.

The lane change path generator 32 may set the initial value and the target value of the host vehicle H using the minimum jerk trajectory like Table 1 below.

TABLE 1

| Initial Value | Target Value |
| --- | --- |
| $t_o = 0$ | $t_f$ = Expected lane change time |
| $x_o = s$ | $x_f = s + v_o t$ |
| $v_o = V_H$ | $v_f = V_H$ |
| $a_o = 0$ | $a_f = 0$ |

In this case, t is defined as time, x is defined as the longitudinal coordinates of the host vehicle, v is defined as the vehicle speed of the host vehicle, and a is defined as the acceleration of the host vehicle. s denotes the longitudinal location of the host vehicle on the curved lane, which is obtained on the curvilinear line. Because it is assumed that the host vehicle travels at a constant speed, both of the initial value and the target value of acceleration a are "0". When the initial value and the target value are set using the minimum jerk trajectory, the lane change path generator 32 may substitute the set initial value and the set target value into the dynamic equation of motion to calculate x and may output the calculated x as the acceleration and deceleration control information C2.

The lane change path generator 32 may be configured with an algorithm or in hardware to calculate an x value of the dynamic equation of motion.

The lane change path generator 32 may include a dynamic equation of motion such as Equation 1 below.

$$x = c_0 + c_1 t + c_2 t^2 + c_3 t^3 + c_4 t^4 + c_5 t^5$$

$$v = c_1 + 2c_2 t + 3c_3 t^2 + 4c_4 t^3 + 5c_5 t^4$$

$$a = 2c_2 + 6c_3 t + 12c_4 t^2 + 20c_5 t^3 \qquad \text{[Equation 1]}$$

In this case, x may be defined as the longitudinal coordinates of the host vehicle, v may be defined as the speed of the host vehicle, a may be defined as the acceleration of the host vehicle, and t may be defined as time.

When x should be calculated using the dynamic equation of motion, first of all, values of $c_0$, $c_1$, $c_2$, $c_3$, $c_4$, and $c_5$ should be calculated.

When substituting t set to the initial value (0) into the dynamic equation of motion, the lane change path generator 32 may calculate $c_0$, $c_1$, and $c_2$ using Equation 2 below.

$$\begin{bmatrix} c_0 \\ c_1 \\ c_2 \end{bmatrix} = \begin{bmatrix} x_0 \\ v_0 \\ \frac{1}{2} a_0 \end{bmatrix} = \begin{bmatrix} 0 \\ V_H \\ 0 \end{bmatrix} \quad \text{[Equation 2]}$$

The lane change path generator 32 may convert the dynamic equation of motion into a matrix such as Equation 3 below to calculate the others $c_3$, $c_4$ and $c_5$.

$$\begin{bmatrix} x_f - c_0 - c_1 - c_2 \\ v_f - c_1 - 2c_2 \\ a_f - 2a_2 \end{bmatrix} = \begin{bmatrix} t_f^3 & t_f^4 & t_f^5 \\ 3t_f^2 & 4t_f^3 & 5t_f^4 \\ 6t_f & 12t_f^2 & 20t_f^3 \end{bmatrix} \begin{bmatrix} c_3 \\ c_4 \\ c_5 \end{bmatrix} \quad \text{[Equation 3]}$$

When summarizing the matrix to calculate $c_3$, $c_4$, and $c_5$, the lane change path generator 32 may represent Equation 3 above as Equation 4 below.

$$\begin{bmatrix} c_3 \\ c_4 \\ c_5 \end{bmatrix} = \begin{bmatrix} t_f^3 & t_f^4 & t_f^5 \\ 3t_f^2 & 4t_f^3 & 5t_f^4 \\ 6t_f & 12t_f^2 & 20t_f^3 \end{bmatrix}^{-1} \begin{bmatrix} x_f - c_0 - c_1 - c_2 \\ v_f - c_1 - 2c_2 \\ a_f - 2a_2 \end{bmatrix} \quad \text{[Equation 4]}$$

The lane change path generator 32 may calculate values of $c_0$, $c_1$, $c_2$, $c_3$, $c_4$, and $c_5$ and may substitute the calculated $c_0$, $c_1$, $c_2$, $c_3$, $c_4$, and $c_5$ into $x = c_0 + c_1 t + c_2 t^2 + c_3 t^3 + c_4 t^4 + c_5 t^5$ to calculate the longitudinal coordinates x of the host vehicle H for the expected lane change time T_inf (t).

The lane change path generator 32 may provide the acceleration and deceleration device 50 with the calculated longitudinal coordinates x as the acceleration and deceleration control information C2.

Next, the operation of generating the lateral coordinates of the lane change path generator 32 will be described below.

The lane change path generator 32 may set the initial value and the target value of the host vehicle H using the minimum jerk trajectory like Table 2 below.

TABLE 2

| Initial Value | Target Value |
|---|---|
| $t_0 = 0$ | $t_f =$ Expected lane change time |
| $x_0 = d$ | $x_f = d \pm w_L$ |
| $v_0 = V_H$ | $v_f = V_H$ |
| $a_0 = 0$ | $a_f = 0$ |

In this case, t is defined as time, x is defined as the lateral coordinates of the host vehicle, v is defined as the vehicle speed of the host vehicle, and a is defined as the acceleration of the host vehicle. d denotes the lateral offset value on the lane center of the host vehicle, which is obtained on the curvilinear line. $w_L$ denotes the lane width (e.g., 4 meters). Because it is assumed that the host vehicle travels at a constant speed, both of the initial value and the target value of acceleration a are "0". Furthermore, $w_L$ may have a plus value ($+w_L$) when the host vehicle makes a lane change to the right. $w_L$ may have a minus value ($-w_L$), when the host vehicle makes a lane change to the left. When the initial value and the target value capable of calculating the lateral coordinates of the host vehicle H are set, the lane change path generator 32 may substitute the initial value and the target value into the dynamic equation of motion used when calculating the longitudinal coordinates like Equation 5 below.

$$x = c_0 + c_1 t + c_2 t^2 + c_3 t^3 + c_4 t^4 + c_5 t^5$$

$$v = c_1 + 2c_2 t + 3c_3 t^2 + 4c_4 t^3 + 5c_5 t^4$$

$$a = 2c_2 + 6c_3 t + 12c_4 t^2 + 20c_5 t^3 \quad \text{[Equation 5]}$$

Furthermore, the lane change path generator 32 may substitute the initial value into the dynamic equation of motion to be the same as that when calculating the longitudinal coordinates to calculate $c_0$, $c_1$, and $c_2$ and may calculate $c_3$, $c_4$, and $c_5$ by means of matrix operation.

Thereafter, the lane change path generator 32 may substitute $c_0$, $c_1$, $c_2$, $c_3$, $c_4$, and $c_5$ into $x = c_0 + c_1 t + c_2 t^2 + c_3 t^3 + c_4 t^4 + c_5 t^5$ to calculate the lateral coordinates x of the host vehicle H for the expected lane change time T_inf (t).

The lane change path generator 32 may provide a steering device 40 of FIG. 1 with the calculated lateral coordinates x as the steering control information C1.

Figure 6:
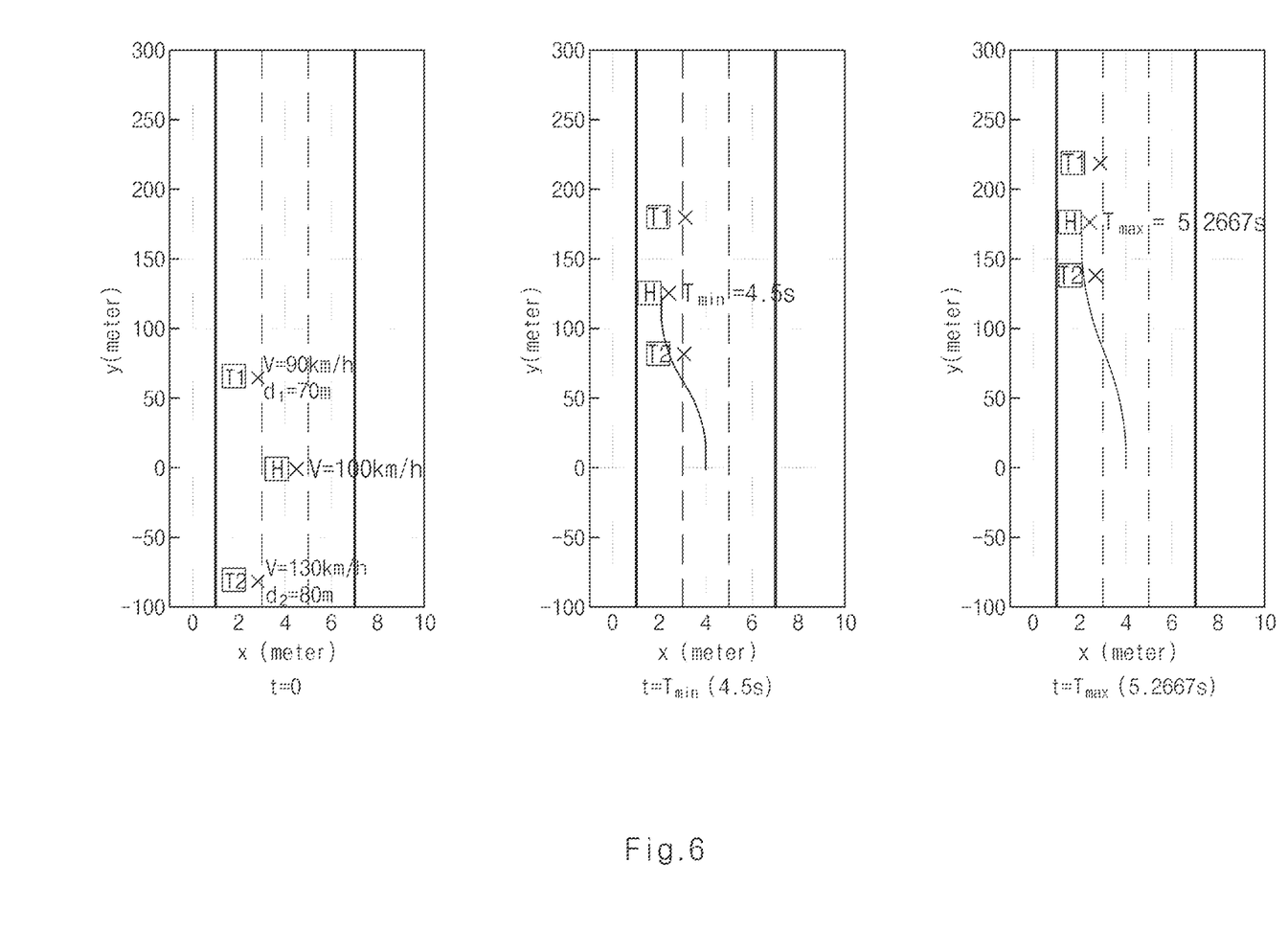

FIG. 6 is a drawing illustrating a lane change path of the host vehicle H when the vehicle speed of the preceding vehicle T1 is 60 km/h, when the vehicle speed of the host vehicle H is 100 km/h, when the vehicle speed of the following vehicle T2 is 130 km/h, when the distance between the preceding vehicle T1 and the host vehicle H is 70 m, and when the distance between the host vehicle H and the following vehicle T2 is 80 m.

A first sensor 10 and a second sensor 20 of FIG. 1 may sense that the vehicle speed of the preceding vehicle T1 is 60 km/h, that the vehicle speed of the host vehicle H is 100 km/h, that the vehicle speed of the following vehicle T2 is 130 km/h, that the distance between the preceding vehicle T1 and the host vehicle H is 70 m, and that the distance between the host vehicle H and the following vehicle T2 is 80 m and may provide the lane change time calculating device 31 included in the lane change controller 30 with the sensed information as the first sensing information S1 and the second sensing information S2.

The lane change time calculating device 31 may determine whether it is possible to make a lane change based on the first sensing information S1 and the second sensing information S2 and may calculate a TTC and a TIV based on a vehicle speed of each of the host vehicle and a surrounding vehicle (e.g., a preceding vehicle or a following vehicle) and an inter-vehicle distance between the host vehicle and the surrounding vehicle. In this case, as described above, it is assumed that the lane change time calculating device 31 determines that it is possible to make a lane change only when the TTC should be greater than or equal to 2 seconds when the relative speed between vehicles is high and determines that it is possible to make a lane change only when the TIV should be greater than or equal to 1 second when the gap is narrow.

Because the relative speed between the host vehicle and the surrounding vehicle is high and the inter-vehicle distance between the host vehicle and the surrounding vehicle is long in the condition shown in FIG. 6, the lane change time calculating device 31 may determine a lane change possible condition based on the TTC.

Because the TTC $$\left(=\frac{d}{V_{lag} - V_{lead}}\right)$$

between the preceding vehicle T1 and the host vehicle H is 7 seconds (=70/(100−90)) and the TTC between the host vehicle H and the following vehicle T2 is 2.66 seconds (=80/(130−100)), there is a lane change possible situation suitable for the TTC.

Thereafter, the lane change time calculating device 31 may calculate $t_1^{max}$ and $t_2^{max}$ based on the TTC and may calculate $t_1^{min}$, $t_2^{min}$, $t_3^{max}$, and $t_4^{max}$ based on the TIV.

In this case, because the vehicle speed of the host vehicle H is higher than the vehicle speed of the preceding vehicle T1 and the vehicle speed of the following vehicle T2 is higher than the vehicle speed of the host vehicle H, the lane change time calculating device 31 may calculate $t_1^{max}$ and $t_2^{max}$ based on the TTC and may calculate $t_3^{max}$ and $t_4^{max}$ based on the TIV.

In this case, because it is assumed that the expected lane change time should be greater than or equal to a minimum of 4.5 seconds in the lane change assistance system according to an embodiment of the present disclosure, the lane change time calculating device 31 may output the largest value among the times ($t_1^{min}$ and $t_2^{min}$) calculated as the minimum time among the calculated times and 4.5 seconds as a minimum time of the expected lane change time T_inf.

Furthermore, because it is assumed that the expected lane change time should be less than 7.5 seconds in the lane change assistance system according to an embodiment of the present disclosure, the lane change time calculating device 31 may output the smallest value among the times ($t_1^{max}$, $t_2^{max}$, $t_3^{max}$, and $t_4^{max}$) calculated as the maximum time and 7.5 seconds as a maximum time of the expected lane change time T_inf.

Therefore, because the condition of calculating $t_1^{min}$ and $t_2^{min}$ is not met, the lane change time calculating device 31 may provide the lane change path generator 32 with 4.5 seconds as the minimum time of the expected lane change time T_inf.

Furthermore, the lane change time calculating device 31 may calculate $t_1^{max}$, $t_2^{max}$, $t_3^{max}$, and $t_4^{max}$ based on $$t_1^{max} = \frac{d_1 - 2(V_H - V_{T1})}{V_H - V_{T1}}, t_2^{max} = \frac{d_2 - 2(V_{T2} - V_H)}{V_{T2} - V_H},$$

$$t_3^{max} = \frac{V_H - d_1}{V_{T1} - V_H}, \text{ and } t_4^{max} = \frac{V_{T2} - d_2}{V_H - V_{T2}}.$$

In this case, because all of the preceding vehicle T1, the host vehicle H, and the following vehicle T3 are in units of km/h, because the distance d1 between the preceding vehicle T1 and the host vehicle H and the distance d2 between the host vehicle H and the following vehicle T2 are in units of m, and because $t_1^{max}$, $t_2^{max}$, $t_3^{max}$, and $t_4^{max}$ and are in units of second rather than in units of hour, the lane change time calculating device 31 should correct and substitute all of the vehicle speeds of the preceding vehicle T1, the host vehicle H, and the following vehicle T2 in units of m/s, when calculating values of $t_1^{max}$, $t_2^{max}$, $t_3^{max}$, and $t_4^{max}$.

When the lane change time calculating device 31 converts the vehicle speed of the preceding vehicle T1 in units of m/s, $V_{T1}$=25 m/s. When the lane change time calculating device 31 converts the vehicle speed of the host vehicle H in units of m/s, $V_H$=27.7778 m/s. When the lane change time calculating device 31 converts the vehicle speed of the following vehicle T2 in units of m/s, $V_{T2}$=36.1111 m/s.

Because $$t_1^{max} = \frac{d_1 - 2(V_H - V_{T1})}{V_H - V_{T1}}$$

and because $t_1^{max}$={70−2*(27.7778−25)}/(27.7778−25), it is calculated that $t_1^{max}$=23.1998 seconds.

Because $$t_2^{max} = \frac{d_2 - 2(V_{T2} - V_H)}{V_{T2} - V_H}$$

and because $t_2^{max}$={80−2*(27.7778−25)}/(27.7778−25), it is calculated that 7.6 seconds.

Because $$t_3^{max} = \frac{V_H - d_1}{V_{T1} - V_H}$$

and because $t_3^{max}$=(27.7778−70)/(25−27.7778), it is calculated that $t_3^{max}$=15.1999 seconds.

Because $$t_4^{max} = \frac{V_{T2} - d_2}{V_H - V_{T2}}$$

and because $t_4^{max}$=(36.1111−80)/(27.7778−36.1111), it is calculated that $t_4^{max}$=5.2667 seconds.

The lane change time calculating device 31 may output a minimum value among values of $t_1^{max}$, $t_2^{max}$, $t_3^{max}$, $t_4^{max}$, and 7.5 seconds as the maximum time of the expected lane change time T_inf, thus providing the lane change path generator 32 with $t_4^{max}$ which is 5.2667 seconds as the maximum time of the expected lane change time T_Inf.

As a result, the lane change time calculating device 31 of the lane change assistance system according to an embodiment of the present disclosure may calculate the expected lane change time T_inf when the lane change time should be greater than or equal to a minimum time (e.g., 4.5 seconds) and should be less than or equal to a maximum time (e.g., 5.2667 seconds) and may provide the lane change path generator 32 with the expected lane change time T_inf.

In this case, the lane change time calculating device 31 may provide the lane change path generator 32 with a time between the minimum time of the expected lane change time T_inf and the maximum time of the expected lane change time T_inf as the expected lane change time T_inf depending on the vehicle speed of the host vehicle H.

For example, the lane change time calculating device 31 may provide the lane change path generator 32 with a time closer to the maximum time of the expected lane change time T_inf as the vehicle speed of the host vehicle H is higher as the expected lane change time T_inf.

Meanwhile, the lane change time calculating device 31 may provide the lane change path generator 32 with a time closer to the minimum time of the expected lane change time T_inf as the vehicle speed of the host vehicle H is lower as the expected lane change time T_inf.

When the expected lane change time T_inf is provided from the lane change time calculating device 31, the lane change path generator 32 may use the initial value and the expected lane change time T_inf as a target value using the minimum jerk trajectory to generate a lane change path by means of the dynamic equation of motion.

In detail, it is assumed that the lane change time calculating device 31 provides the lane change path generator 32 with the expected lane change time T_inf as the minimum time (e.g., 4.5 seconds).

The lane change path generator 32 may set the initial value and the target value using the minimum jerk trajectory and may substitute the set values into the dynamics equation $$(x=c_0+c_1t+c_2t^2+c_3t^3+c_4t^4+c_5t^5$$

$$v=c_1+2c_2t+3c_3t^2+4c_4t^3+5c_5t^4$$

$$a=2c_2+6c_3t+12c_4t^2+20c_5t^3)$$

to calculate values of $c_0$, $c_1$, $c_2$, $c_3$, $c_4$, and $c_5$.

In this case, when the lane change path generator 32 sets the initial value and the target value using the minimum jerk trajectory, the initial value and the target value may be differently set as Table 3 below when calculating a longitudinal location (coordinates) of the host vehicle H and a lateral location (coordinates) of the host vehicle H.

TABLE 3

| Initial Value | Target Value |
|---|---|
| When calculating longitudinal location | |
| $t_0 = 0$ | $t_f$ = Expected lane change time |
| $x_0 = s$ | $x_f = s + V_0 t$ |
| $v_0 = V_H$ | $v_f = V_H$ |
| $a_0 = 0$ | $a_f = 0$ |
| When calculating lateral location | |
| $t_0 = 0$ | $t_f$ = Expected lane change time |
| $x_0 = d$ | $x_f = d \pm w_L$ |
| $v_0 = V_H$ | $v_f = V_H$ |
| $a_0 = 0$ | $a_f = 0$ |

Thereafter, the lane change path generator 32 may substitute the calculated values of $c_0$, $c_1$, $c_2$, $c_3$, $c_4$, and $c_5$ into $x=c_0+c_1t+c_2t^2+c_3t^3+c_4t^4+c_5t^5$ and may substitute times obtained by equally dividing between from the initial value ($t_0=0$) to the target value ($t_f$=the expected lane change time: 4.5 seconds) by a predetermined time into t, thus calculating a longitudinal location of the host vehicle H and a lateral location of the host vehicle H to generate a lane change path.

For example, the lane change path generator 32 may substitute a time between from 0 second to 4.5 seconds at intervals of 0.1 seconds into t of $x=c_0+c_1t+c_2t^2+c_3t^3+c_4t^4+c_5t^5$ to generate the lane change path.

In the above manner, when generating the lane change path by means of the minimum time (e.g., 4.5 seconds) of the expected lane change time T_inf, the lane change path generator 32 may generate the lane change path such that t=Tmin in FIG. 6.

In addition, when generating the lane change path by means of the maximum time (e.g., 5.2667 seconds) of the expected lane change time T_inf, the lane change path generator 32 may generate the lane change path such that t=Tmax in FIG. 6.

The lane change assistance system according to an embodiment of the present disclosure may identify the lane change possible condition based on the TTC and the TIV and may calculate the expected lane change time to generate the lane change path.

In addition, the lane change assistance system may calculate both the minimum time and the maximum time of the expected lane change time and may select the expected lane change time depending on the vehicle speed of the host vehicle between the calculated minimum time and the calculate maximum time.

Furthermore, when the expected lane change time is generated, the lane change assistance system may set the initial value and the target value capable of calculating longitudinal coordinates and lateral coordinates of the host vehicle using the minimum jerk trajectory and may substitute the set initial value and the set target value into the dynamic equation of motion to calculate a consecutive lane change path. Thus, the lane change assistance system is a technology suitable for a vehicle which travels at a high speed.

The present technology may calculate a minimum/maximum time for completing a lane change while avoiding a collision with target vehicles which are traveling on a target lane when a host vehicle makes a lane change and may generate a consecutive lane change path according to the calculated time, such that it is possible for the host vehicle which is traveling at a high speed to safely make a lane change.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A lane change assistance system, comprising:
   at least one sensor configured to detect sensing information, which includes a first vehicle speed of a host vehicle, a second vehicle speed of a surrounding vehicle around the host vehicle, and a distance between the host vehicle and the surrounding vehicle;
   a lane change controller configured to:
      identify a lane change possible condition based on the sensing information,
      calculate an expected lane change time of the host vehicle, and
      generate a lane change path for the expected lane change time;
   a steering device configured to control lateral movement of the host vehicle based on the lane change path; and
   an acceleration and deceleration device configured to control longitudinal movement of the host vehicle based on the lane change path,
   wherein the expected lane change time includes a minimum time and a maximum time that is greater than the minimum time, and wherein the lane change controller calculates a Time To Collision (TTC) and an Inter-Vehicular Time (TIV) based on the sensing information to identify the lane change possible condition, calculates the minimum time and the maximum time of the expected lane change time according to the sensing information based on the TTC and the TIV, respectively, selects a time between the minimum time and the maximum time as a final expected lane change time depending on the first vehicle speed, and generates the lane change path based on the final expected lane change time.

2. The lane change assistance system of claim 1, wherein, when the first vehicle speed is higher than the second vehicle speed, the lane change controller is configured to select the final expected lane change time to be closer to the maximum time, and wherein, when the first vehicle speed is lower than the second vehicle speed, the lane change controller is configured to select the final expected lane change time closer to the minimum time.

3. The lane change assistance system of claim 1, wherein the lane change controller sets an initial value and a target value based on the final expected lane change time using a minimum jerk trajectory and generates the lane change path depending on a dynamic equation of motion based on the set initial value and the set target value.

4. The lane change assistance system of claim 2, wherein the lane change path includes lateral coordinates and longitudinal coordinates of the host vehicle, and wherein, when generating the lateral coordinates and the longitudinal coordinates, the lane change controller sets the initial value and the target value to differ from each other.

5. The lane change assistance system of claim 3, wherein, when generating the lateral coordinates and the longitudinal coordinates to generate the lane change path, the lane change controller equally divides between an initial time included in the set initial value and the final expected lane change time included in the set target value at intervals of a predetermined time and consecutively substitutes the divided times into the dynamic equation of motion to generate the lateral coordinates and the longitudinal coordinates being consecutive.

6. The lane change assistance system of claim 1, wherein the TTC is a time until the host vehicle and the surrounding vehicle collide with each other by a relative speed between the host vehicle and the surrounding vehicle, and wherein the TIV is a time when a following vehicle, which is travelling behind the host vehicle, arrives at a location of a preceding vehicle, which is travelling in front of the host vehicle, between the host vehicle and the surrounding vehicle.

7. The lane change assistance system of claim 6, wherein the TTC is a time calculated based on the relative speed between the host vehicle and the surrounding vehicle and the distance between the host vehicle and the surrounding vehicle, wherein the TIV is a time calculated based on the distance between the host vehicle and the surrounding vehicle and a third vehicle speed of the following vehicle between the host vehicle and the surrounding vehicle, and wherein the lane change possible condition includes a situation in which, the calculated TTC and the calculated TIV are longer than predetermined times, respectively.

8. The lane change assistance system of claim 1, wherein the surrounding vehicle includes, when the host vehicle makes a lane change, a preceding vehicle and a following vehicle traveling on a target path in front of the host vehicle and behind the host vehicle, respectively, and wherein the lane change controller includes a lane change time calculating device and a lane change path generator, wherein the lane change time calculating device:
calculates the minimum time and the maximum time of the expected lane change time based on the first vehicle speed, a fourth vehicle speed of the preceding vehicle, a third vehicle speed of the following vehicle, a distance between the host vehicle and the preceding vehicle, and a distance between the host vehicle and the following vehicle depending on the sensing information,
selects a time between the minimum time and the maximum time as a final expected lane change time depending on the first vehicle speed, and
provides the lane change path generator with the final expected lane change time, and wherein the lane change path generator sets an initial value and a target value based on the final expected lane change time using a minimum jerk trajectory and generates the lane change path depending on a dynamic equation of motion based on the set initial value and the set target value.

9. The lane change assistance system of claim 8, wherein the lane change time calculating device:
calculates a first minimum time based on the first vehicle speed, the fourth vehicle speed of the preceding vehicle, and the distance between the host vehicle and the preceding vehicle,
calculates a second minimum time based on the first vehicle speed e, the third vehicle speed, and the distance between the host vehicle and the following vehicle, and
selects the largest time, among the first and second minimum times, and a predetermined time, as the minimum time of the expected lane change time.

10. The lane change assistance system of claim 9, wherein the first minimum time and the second minimum time are calculated based on the following equations, respectively:

$$t_1^{min} = \frac{V_H - d_1}{V_{T1} - V_H},$$
$$t_2^{min} = \frac{V_{T2} - d_2}{V_H - V_{T2}},$$

wherein $t_1^{min}$ the first minimum time, $t_2^{min}$ is the second minimum time, $V_H$ is the first vehicle speed, $V_{T1}$ is the fourth vehicle speed, $V_{T2}$ is the third vehicle speed, $d_1$ is the distance between the preceding vehicle and the host vehicle, $d_2$ and is the distance between the host vehicle and the following vehicle.

11. The lane change assistance system of claim 8, wherein the lane change time calculating device:
calculates a first maximum time based on the first vehicle speed, the fourth vehicle speed, and the distance between the preceding vehicle and the host vehicle,
calculates a second maximum time based on the first vehicle speed, the third vehicle speed, and the distance between the host vehicle and the following vehicle, calculates a third maximum time based on the first vehicle speed, the fourth vehicle speed, and the distance between the preceding vehicle and the host vehicle, calculates a fourth maximum time based on the first vehicle speed, the third vehicle speed, and the distance between the host vehicle and the following vehicle, and selects the smallest time, among the first maximum time, the second maximum time, the third maximum time, the fourth maximum time, and a predetermined time, as the maximum time of the expected lane change time.

12. The lane change assistance system of claim 11, wherein the first, second, third, and fourth maximum times are calculated based on the following equations, respectively:

$$t_1^{max} = \frac{d_1 - 2(V_H - V_{T1})}{V_H - V_{T1}},$$

$$t_2^{max} = \frac{d_2 - 2(V_{T2} - V_H)}{V_{T2} - V_H},$$

$$t_3^{max} = \frac{V_H - d_1}{V_{T1} - V_H},$$

$$t_4^{max} = \frac{V_{T2} - d_2}{V_H - V_{T2}},$$

wherein $t_1^{max}$ is the first maximum time, $t_2^{max}$ is the second maximum time, $t_3^{max}$ is the third maximum time, $t_4^{max}$ is the fourth maximum time, $V_H$ is the first vehicle speed, $V_{T1}$ is the fourth vehicle speed, $V_{T2}$ is the third vehicle speed, $d_1$ is the distance between the preceding vehicle and the host vehicle, $d_2$ and is the distance between the host vehicle and the following vehicle.

13. The lane change assistance system of claim 8, wherein, when calculating longitudinal coordinates of the host vehicle using the minimum jerk trajectory, the lane change path generator sets the initial value as $t_0=0$, $x_0=s$, $v_0=V_H$, and $a_0=0$ and sets the target value as tf=expected lane change time, $x_f=s+v_0 t$, $v_f=V_H$, and $a_f=0$, wherein the dynamic equation of motion is defined as $$x = c_0 + c_1 t + c_2 t^2 + c_3 t^3 + c_4 t^4 + c_5 t^5$$

$$v = c_1 + 2c_2 t + 3c_3 t^2 + 4c_4 t^3 + 5c_5 t^4$$

$$a = 2c_2 + 6c_3 t + 12c_4 t^2 + 20c_5 t^3 \quad \text{[Equation 1]}$$

wherein t refers to a current time, $t_0$ refers to a time before a lane change, $t_f$ refers to a lane change completion time, x refers to the longitudinal coordinates, $x_0$ refers to current longitudinal coordinates of the host vehicle, $x_f$ refers to longitudinal coordinates of the host vehicle, the lane change of which is completed, v refers to the first vehicle speed, $v_0$ refers to a current first vehicle speed of the host vehicle, $v_f$ refers to a final vehicle speed of the host vehicle when the lane change is completed, a refers to an acceleration of the host vehicle, $a_0$ refers to a current acceleration of the host vehicle, $a_f$ refers to a final acceleration of the host vehicle when the lane change completed, and s refers to a longitudinal location of the host vehicle on a curved lane in which the longitudinal location being obtained on a curvilinear line.

14. The lane change assistance system of claim 8, wherein, when calculating lateral coordinates of the host vehicle using the minimum jerk trajectory, the lane change path generator set the initial value as $t_0=0$, $x_0=d$, $v_0=V_H$, and $a_0=0$ and sets the target value as tf=expected lane change time, tf=expected lane change time, $x_f=d\pm w_L$, $v_f=V_H$, and $a_f=0$, and wherein the dynamic equation of motion is defined as $$x = c_0 + c_1 t + c_2 t^2 + c_3 t^3 + c_4 t^4 + c_5 t^5$$

$$v = c_1 + 2c_2 t + 3c_3 t^2 + 4c_4 t^3 + 5c_5 t^4$$

$$a = 2c_2 + 6c_3 t + 12c_4 t^2 + 20c_5 t^3$$

wherein t refers to a current time, $t_0$ refers to a time before a lane change, $t_f$ refers to a lane change completion time, x refers to the lateral coordinates, $x_0$ refers to current lateral coordinates of the host vehicle, $x_f$ refers to final lateral coordinates of the host vehicle, the lane change of which is completed, v refers to the first vehicle speed, $v_0$ refers to a current first vehicle speed of the host vehicle, $v_f$ refers to a final first vehicle speed of the host vehicle when the lane change is completed, a refers to an acceleration of the host vehicle, $a_0$ refers to a current acceleration of the host vehicle, $a_f$ refers to a final acceleration of the host vehicle when the lane change is completed, d refers to a lateral offset value on a lane center of the host vehicle, the lateral offset value being obtained on a curvilinear line, $w_L$ refers to a lane width, $+w_L$ refers to a lane change to the right, and $-w_L$ refers to a lane change to the left.

15. A lane change method, comprising:
detecting, by at least one sensor, sensing information including a first vehicle speed of a host vehicle, a second vehicle speed of a surrounding vehicle, and a distance between the host vehicle and the surrounding vehicle;

determining, by a controller, whether a lane change possible condition is satisfied based on the sensing information;

upon determining that the lane change possible condition is satisfied, calculating, by the controller, an expected lane change time based on the sensing information; and generating, by the controller, a lane change path based on the expected lane change time, wherein the generating of the lane change path includes:
setting an initial value and a target value including the expected lane change time using a minimum jerk trajectory; and generating the lane change path according to a dynamic equation of motion based on the set initial value and the set target value, wherein the expected lane change time includes a minimum time and a maximum time that is greater than the minimum time, wherein the determining whether the lane change possible condition includes calculating a Time To Collision (TTC) and an Inter-Vehicular Time (TIV) based on the sensing information to identify the lane change possible condition, wherein the calculating the expected lane change time includes:
calculating the minimum time and the maximum time of the expected lane change time according to the sensing information based on the TTC and the TIV, respectively, and;

selecting a time between the minimum time and the maximum time as a final expected lane change time depending on the first vehicle speed; and wherein the generating the lane change path includes generating the lane change path based on the final expected lane change time.

16. The lane change method of claim 15,
wherein the TTC is a time until the host vehicle and the surrounding vehicle collide with each other by a relative speed between the host vehicle and the surrounding vehicle, and the TIV is a time when a following vehicle, which is driving behind the host vehicle, arrives at a location of a preceding vehicle between the host vehicle and the surrounding vehicle.

17. The lane change method of claim 16, wherein, when the host vehicle makes a lane change, the surrounding vehicle includes the preceding vehicle and the following vehicle traveling on a target path in front and behind the host vehicle, respectively,
wherein the calculating of the expected lane change time includes:
calculating a first minimum time based on the first vehicle speed of the host vehicle, a third vehicle speed of the preceding vehicle, and a distance between the host vehicle and the preceding vehicle and calculating a second minimum time based on the first vehicle speed, a fourth vehicle speed of the following vehicle, and a distance between the host vehicle and the following vehicle;
selecting the largest time, among the first minimum time, the second minimum time, and a predetermined time, as the minimum time of the expected lane change time;
calculating a first maximum time based on the first vehicle speed, the third vehicle speed, and the distance between the preceding vehicle and the host vehicle, calculating a second maximum time based on the first vehicle speed, the fourth vehicle speed, and the distance between the host vehicle and the following vehicle, calculating a third maximum time based on the first vehicle speed, the third vehicle speed, and the distance between the preceding vehicle and the host vehicle, and calculating a fourth maximum time based on the first vehicle speed, the fourth vehicle speed, and the distance between the host vehicle and the following vehicle; and
selecting the smallest time, among the first maximum time, the second maximum time, the third maximum time, the fourth maximum time, and a predetermined time as the maximum time of the expected lane change time.

18. The lane change method of claim 15, wherein the generating of the lane change path includes:
when calculating longitudinal coordinates of the host vehicle using the minimum jerk trajectory, setting the initial value as $t_0=0$, $x_0=s$, $v_0=V_H$, and $a_0=0$ and defining the target value as tf=expected lane change time, $x_f=s+v_0 t$, $v_f=V_H$, and $a_f=0$, and wherein the dynamic equation of motion is defined as $$x=c_0+c_1 t+c_2 t^2+c_3 t^3+c_4 t^4+c_5 t^5$$

$$v=c_1+2c_2 t+3c_3 t^2+4c_4 t^3+5c_5 t^4$$

$$a=2c_2+6c_3 t+12c_4 t^2+20c_5 t^3$$

wherein t refers to a current time, $t_0$ refers to a time before a lane change, $t_f$ refers to a lane change completion time, x refers to the longitudinal coordinates, $x_0$ refers to current longitudinal coordinates of the host vehicle, $x_f$ refers to longitudinal coordinates of the host vehicle when the lane change is completed, v refers to the first vehicle speed, $v_0$ refers to a current first vehicle speed, $v_f$ refers to a final first vehicle speed when the lane change is completed, a refers to an acceleration of the host vehicle, $a_0$ refers to a current acceleration of the host vehicle, $a_f$ refers to a final acceleration of the host vehicle when the lane change is completed, and s refers to a longitudinal location of the host vehicle on a curved lane in which the longitudinal location being obtained on a curvilinear line.

19. The lane change method of claim 1, wherein the generating of the lane change path includes:
defining the initial value as $t_0=0$, $x_0=d$, $v_0=V_H$, and $a_0=0$ and defines the target value as tf=expected lane change time, $x_f=d\pm w_L$, $v_f=V_H$, and $a_f=0$, when calculating lateral coordinates of the host vehicle using the minimum jerk trajectory, and
wherein the dynamic equation of motion is defined as $$x=c_0+c_1 t+c_2 t^2+c_3 t^3+c_4 t^4+c_5 t^5$$

$$v=c_1+2c_2 t+3c_3 t^2+4c_4 t^3+5c_5 t^4$$

$$a=2c_2+6c_3 t+12c_4 t^2+20c_5 t^3$$

wherein t refers to time, $t_0$ refers to a time before a lane change, $t_f$ refers to a lane change completion time, x refers to the lateral coordinates, $x_0$ refers to current lateral coordinates of the host vehicle, $x_f$ refers to lateral coordinates of the host vehicle when the lane change is completed, v refers to the first vehicle speed, $v_0$ refers to a current first vehicle speed of the host vehicle, $v_f$ refers to a final first vehicle speed of the host vehicle when the lane change is completed, a refers to an acceleration of the host vehicle, $a_0$ refers to a current acceleration of the host vehicle, $a_f$ refers to a final acceleration of the host vehicle when the lane change is completed, d refers to a lateral offset value on a lane center of the host vehicle in which the lateral offset value being obtained on a curvilinear line, $w_L$ refers to a lane width, $+w_L$ refers to a lane change to the right, $-w_L$ and refers to a lane change to the left.

* * * * *